United States Patent [19]

Evans

[11] 4,386,458

[45] Jun. 7, 1983

[54] FATIGUE RESISTANCE FOR COUPLING AND CONNECTION JOINT MECHANISMS

[76] Inventor: Robert F. Evans, 631 Honeywood La., La Habra, Calif. 90631

[21] Appl. No.: 249,721

[22] Filed: Mar. 31, 1981

[51] Int. Cl.³ .................. B22D 11/126; B23K 9/00; H05B 5/00; H05B 9/00
[52] U.S. Cl. .................. 29/527.7; 29/DIG. 42; 29/527.6; 29/447; 29/446; 29/DIG. 24; 148/131; 219/121 EM; 219/121 LM; 219/59.1; 219/7.5; 219/8.5; 219/10.43; 219/10.57; 285/333; 403/343; 403/11; 175/320
[58] Field of Search .............. 148/131; 219/121 LF, 219/59.1, 61.1, 61.2, 121 EG, 121 EF, 121 EM, 121 LM, 121 LE, 7.5, 8.5, 10.43, 10.57; 175/320; 285/333, 334; 72/103, 104; 403/343, 11, 12; 29/527.7, 446, 447, 527.6

[56] References Cited

U.S. PATENT DOCUMENTS

| | | | |
|---|---|---|---|
| 2,316,110 | 4/1943 | Somes | 148/31 |
| 2,641,488 | 6/1953 | Dunn | 285/333 |
| 2,682,936 | 7/1954 | Almen | 188/218 |
| 3,210,223 | 10/1965 | Good | 148/131 |
| 3,312,576 | 4/1967 | Palik | 148/11.5 |
| 3,320,102 | 5/1967 | Murphy | 148/131 |
| 3,522,178 | 1/1971 | Felgar, Jr. | 72/342 |
| 3,590,409 | 6/1971 | Bergere | 72/103 |
| 3,659,882 | 5/1972 | Souresny | 285/333 |
| 3,773,565 | 11/1973 | Pye | 148/1 |
| 3,817,796 | 6/1974 | Kramer | 148/131 |
| 3,838,288 | 9/1974 | Stolz | 250/492 |
| 4,000,011 | 12/1976 | Sato | 148/4 |
| 4,093,842 | 6/1978 | Scott | 219/121 LF |
| 4,167,864 | 9/1979 | Taipale | 72/53 |
| 4,202,484 | 5/1980 | Peterson | 228/173 |

OTHER PUBLICATIONS

"The Drill Stem", (Unit 1, Lesson 3), a Home Study Course Issued by Petroleum Extension Service, The University of Texas at Austin.
"Drill Pipe Fatigue Failure", *The Oil and Gas Journal*, Apr. 18, 1966.
Residual Stresses and Fatigue in Metals, by John O. Almen and Paul H. Black, Chapters 4 through 6.

*Primary Examiner*—Francis S. Husar
*Assistant Examiner*—V. K. Rising
*Attorney, Agent, or Firm*—John R. Ley

[57] ABSTRACT

Residual favorable stresses are induced in a zone of stress concentration in a coupling and connection joint mechanism of a drill collar or drilling tool, for example. The residual favorable stress is created by tensily stressing the material within elastic limits, relieving the stress in the zone by heating the material therein into a nonstressed plastic or liquid state, and releasing the tensile stress maintained in an area adjacent the zone. The residual force of elasticity in the area adjacent the zone applies the favorable residual stress in the zone. Preferably, the favorable residual stress is a compressive stress to resist fatigue failures from tension-induced cracks. The extent and depth of penetration of the favorable residual stress in the zone is controlled and is substantially greater than that available from mechanical coldworking surface-hardening techniques.

12 Claims, 5 Drawing Figures

FATIGUE RESISTANCE FOR COUPLING AND CONNECTION JOINT MECHANISMS

BACKGROUND

This invention pertains to a method of improving the resistance to fatigue failure of coupling and connection joint mechanisms, specifically with respect to joint mechanisms operative to connect two mechanical elements which are required to rotate in unison and generally coaxially about a common axis. Even more specifically, the present invention provides improvements and finds substantial utility in the field of earth drilling equipment and specifically with respect to improving the fatigue failure resistance of threaded connections in drill collars and tool joints.

Fatigue failures typically occur as a result of gradual progressive growth of minor irregularities into major cracks. Minor cracks or irregularities typically originate in areas where the stress is concentrated, as for example at sharp notches, grooves or other surface discontinuities. Upon the application of a tension force, the minor cracks propagate and enlarge, and failure is the eventual result. In situations of cyclic variations in stress or cyclic stress reversals, where tension forces are periodically replaced by compression forces or tension forces of a different magnitude, the alternating stress magnitude more rapidly propagates the minor cracks to major detrimental proportions. Cyclic variations in stress or cyclic stress reversals will cause fatigue failure even when the average tensile stress applied is much less than the yield strength of the material.

All of the factors promoting fatigue failure are acutely present in earth drilling situations. All of the drill collars or pipes comprising the drill string, and all of the drilling tools connected to the drill string, are connected together at threaded coupling and connection joints. The threads, of course, define relatively sharp notches and grooves and are areas where stress is inherently concentrated. In many cases, the threaded ends of the drill collars and tools are of reduced size and therefore strength, leaving less material to inherently resist fatigue failure. All of the drill string elements except those within a few hundred feet of the drill bit are operated in a continuous state of tension due to the fact that the weight of the relatively lengthy drill string, even when buoyed by the drilling fluid, typically exceeds that weight required to obtain effective drill bit penetration and cutting rates. Only under extremely rare conditions will a well bore be cut and advanced along a straight axis because the geological formations will typically induce lateral deflection of various degrees in the drilling equipment as drilling progresses. As the drill string is pulled tangent to the inner curved wall of a well bore dogleg, bending is predominant in the coupling and connection joints. Rotation of the bent drill string creates cyclic stress reversals or stress alterations with an added compression force occurring at points on the drill string rotating adjacent the inner curve of the dogleg and with an added tension force occurring at diametrically opposite points on the drill string. The chemicals introduced into the drilling fluid or mud have a corrosive effect on the drilling equipment, and after a period of use may induce surface irregularities in the form of corrosion pitting and the like. These irregularities can also create areas of stress concentration.

The detrimental nature of the service-induced forces at play on earth drilling tools, and the necessity for improving the fatigue resistance for coupling and connection joints in earth drilling tools, have previously been recognized. The previous procedure for increasing fatigue resistance has been to cold work the roots of the threads, either by use of a hydraulic roller or a peening tool. The metal in the thread root is left in a compressed state that gives improved resistance to fatigue failure. The residual compressive stresses induced by cold working extend only to a relatively shallow depth below the surface of the thread roots, and the magnitude of the induced resistance to fatigue failure is similarly limited. From this and other background information, the objectives of the present invention are more readily appreciated.

SUMMARY

One primary objective of the present invention is to increase the resistance to fatigue failure of coupling and connection joint mechanisms in machine elements, particularly with respect to rotating machine elements wherein the joint mechanism causes the connected machine elements to rotate in a generally coaxial relationship. Another significant objective is to substantially improve and increase the resistance to fatigue failure of threaded coupling and connection joints, particularly in drill collars and other drilling tools. Another objective is to provide drill collars and drilling tools which exhibit increased resistance to fatigue failure. A further objective is to provide a technique for maintaining and controlling exact physical dimensions and tolerances of threads and other machined surfaces in a connection joint by beneficial use of induced residual stresses.

In accordance with certain summary aspects, the present invention pertains to a new and improved method of inducing residual favorable stresses in a zone of material by elastically stressing the material in the zone and in an area adjacent the zone, relieving the elastic stress in the zone while maintaining the elastic stress in the area adjacent the zone, and releasing the elastic stress in the area adjacent the zone. The force of elasticity causes the material in the area adjacent the zone to attempt to return to its nonstressed condition and in doing so induces the residual favorable stress in the zone. The magnitude of the residual favorable stress in the zone is counterbalanced by a magnitude of residual stress of the opposite characteristic existing in the area adjacent the zone.

The technique is applied to the base location from which threads initiate and extend away from the main body portion of a drilling tool or drill collar. After creating the residual favorable stress, the threads or other connection means are machined or formed into the zone of material. The residual favorable stress in the zone achieves improved resistance to fatigue failure because the magnitude and depth of induced residual stress is substantially greater than that availalbe from conventional cold-working, surface-hardening techniques. When used in conjunction with the typical thread-rolling cold work technique, the present technique of creating a residual favorable stress secures significantly improved resistance to fatigue failure, even under the diverse and acute potentially detrimental forces at play on drilling tools or other types of equipment where a connection joint mechanism attaches and locates two machine elements for coaxial rotation.

A more complete understanding of the nature of the present invention can be obtained from the following detailed description of preferred embodiments and from the accompanying drawings.

DRAWINGS

Figure 3:
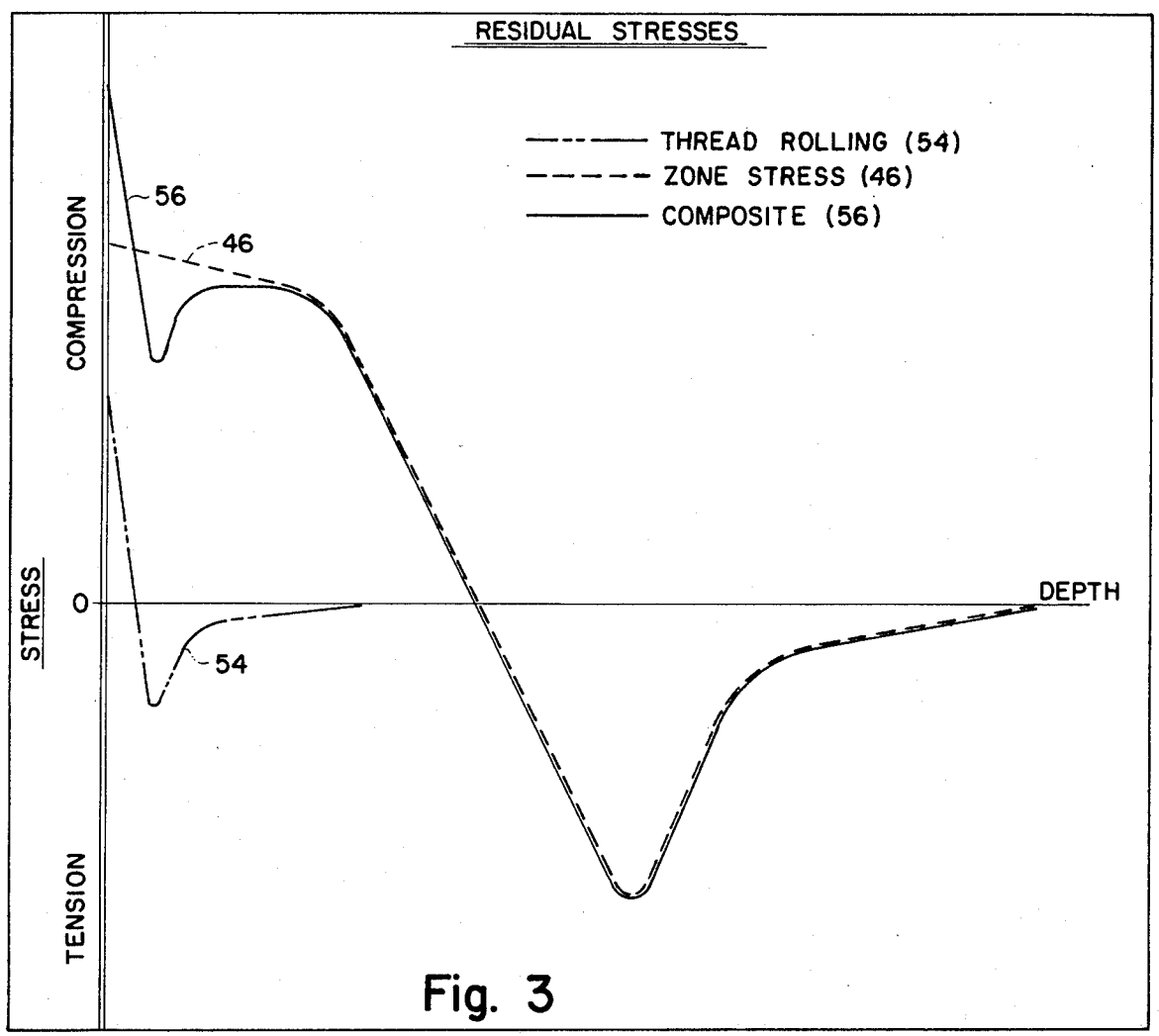

FIG. 3 is a graph of tension and compression stresses in relation to depth, which illustrates the nature and extent of the residual favorable stresses induced according to the method of the present invention and the favorable residual stresses available from a thread-rolling, cold work technique, and which illustrates a composite of the effects available by applying both the method of the present invention and the thread-rolling cold work technique in combination.

Figure 2:
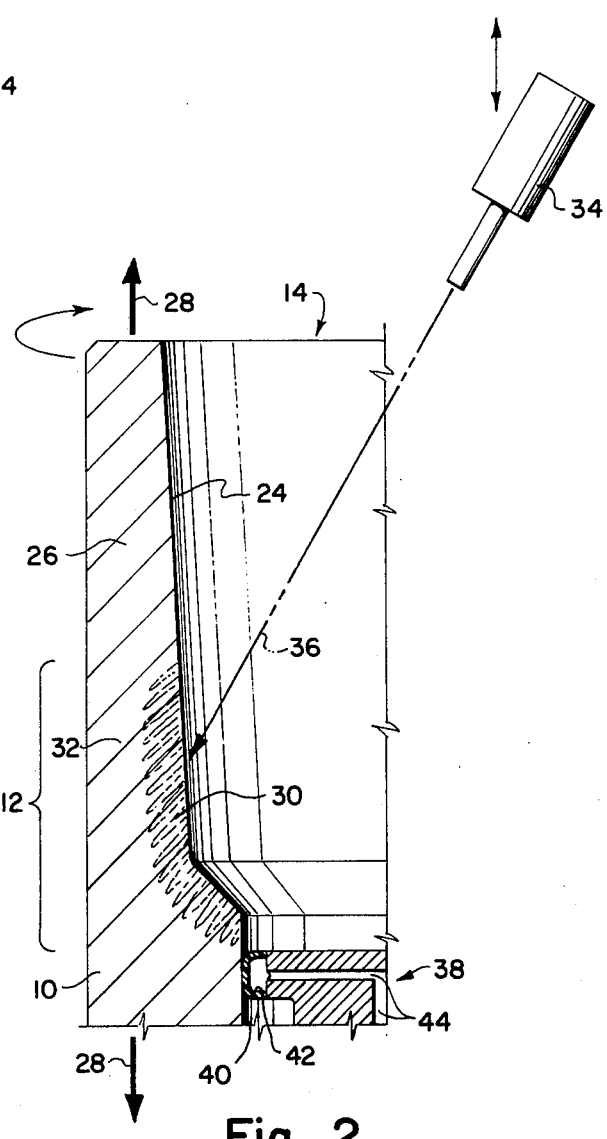
FIG. 2 is a left-hand section view of a drill collar taken along its rotational axis, illustrating the nature of the method according to the present invention applied to the end of the drill collar at which a threaded box connection joint is to be formed.
Figure 4:
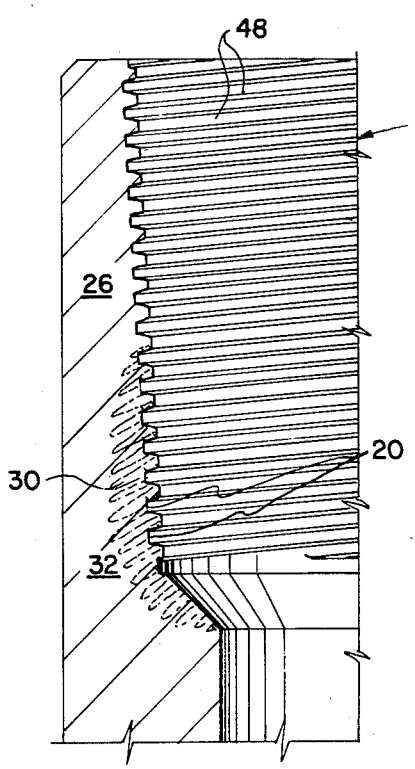

FIG. 4 is a view similar to FIG. 2 which additionally illustrates the box connection joint after the method of the present invention has been practiced thereon and after the threads have been formed therein.

Figure 5:
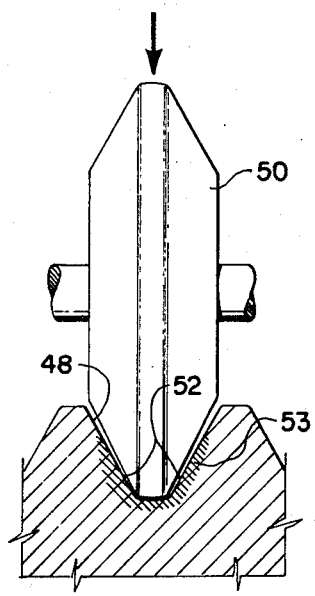

FIG. 5 is a generalized mechanical schematic illustrating the application of a thread-rolling cold work technique to thread roots.

PREFERRED EMBODIMENTS

Figure 1:
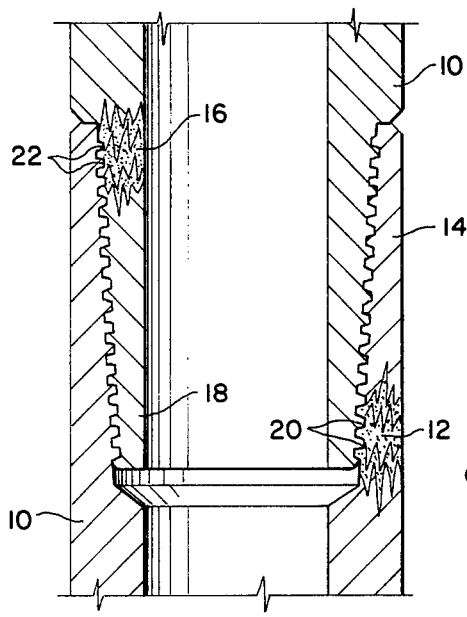
FIG. 1 is an axial section view taken at a conventional threaded connection joint between two threadably connected drill collars.

Fatigue failure from secured-induced forces typically occurs in a drill collar 10, as shown in FIG. 1, at areas of stress concentration at a base location 12 of a threaded female connection joint mechanism or element known as a box 14 at one end of the drill collar, or at a base location 16 of a male threaded connection joint mechanism or element known as a pin 18 at the other end of the drill collar. A threaded box 14 or a threaded pin 18 or both are formed on the various drilling tools utilized in earth drilling equipment. Of course, the threads on the boxes and pins of all the drilling tools are adapted to operatively screw together when the drilling tools are connected, as illustrated by the two connected drill collars 10 shown in FIG. 1.

The base location 12 of stress concentration in the box 14 extends radially outward from and is axially centered about the innermost two threads 20 of the box 14. The innermost two threads 20 define the location from which the threads of the box 14 initiate and extend away from the major or center portion of the drilling tool. Fatigue failure in the box occurs as the cracks initiate and propagate radially outward or deeper into the drill collar material from the threads 20. The base location 16 of stress concentration in the pin 18 extends radially inward from and is axially centered about the innermost two threads 22 of the pin 18. The innermost two threads 22 define the location from which the threads of the pin 18 initiate and extend away from the major or center portion of the drilling tool. Fatigue failure in the pin occurs as cracks initiate and propagate radially inward or deeper into the drill collar material from the threads 22.

In order to increase the resistance to fatigue failure, in accordance with the present invention, a zone of favorable compressive residual stress is induced at the base location 12 of the box 14 and/or at the base location 16 of the pin 18. The residual compressive stress is available to resist the formation and propagation of cracks and irregularities which normally result in fatigue failure.

The method according to the present invention is described in conjunction with FIGS. 2, 3 and 4 and a drill collar box 14, but it can also be applied to pins 18 of other drilling tools, as well as other coupling and connection joint mechanisms having threads or other types of connection means. A drill collar 10 is, of course, formed of metallic material such as steel. The method of the present invention can be applied with any type of material having a physical microstructure which exhibits elastically deformable and resilient stress characteristics and which can be stress relieved by restructuring of the fibers or microstructure of the material through heating, fusing the fibers, or the like.

At the end of the drill collar 10 at which the box 14 is to be formed, an internal thread connection blank surface 24 is machined. The blank surface 24 diverges radially and axially outward from the main center portion of the drill collar 10. Sufficient material 26 exists radially outward of the blank surface 24 to allow finish machining of the threads, to secure the strength necessary to support and hold the various drilling tools when in use, and to create the residual favorable stress in accordance with the present invention. Of course, when the method of the present invention is applied to a pin 18, for example, a comparable blank surface is formed on the exterior of the material defining the pin.

In practicing the present invention, a force 28 is applied to the material 26 of the drill collar 10 over at least the location 12, and preferably over the material defining the whole of the box 14 and a portion of the center portion of the drill collar adjacent the box 14. The force 28 induces a tensile stress of predetermined magnitude within the elastic limit of the material in the location 12 and preferably between the other locations where the force 28 is applied. The force 28 is applied by conventional mechanisms (not shown) which operatively grip the drill collar 10 and apply the force in a controlled manner.

As will become more apparent, the elastic stress in a zone 30 extending inward into the material 26 from the blank surface 24 will be relieved. Once stress relief occurs in the zone 30, the remaining portion of the material 26 in an area 32 adjacent the zone 30 must withstand the force 28. Since the material of area 32 is of reduced cross sectional dimension, the magnitude of the force 28 must be accordingly reduced or adjusted to maintain a predetermined magnitude of elastic stress-inducing force 28 throughout the material in the area 32.

After the material 26 in the location 12 is elastically and tensily stressed as a result of the force 28, the stress is relieved in an annular zone 30. Stress relief occurs preferably by fusing the fibers of material in the zone 30 into a nonstressed condition, as by momentarily heating the material in the zone 30 into a plastic state or a liquid state. Heating is preferably accomplished by directing a high energy beam of electrons from a conventional electron beam gun 34 along the trajectory 36 and into the material 26 at the surface 24. As is known, the heating and penetration characteristics of an electron beam can be precisely controlled and, as a result, the depth of penetration of material heated into the plastic or liquid state can also be precisely controlled. A predetermined pattern and depth of fusion results, and the zone 30 is defined to a predetermined depth with reference to the blank surface 24. Because the energy of the electron beam can be precisely controlled and heating quickly effected, the heat generated in the zone 30 is not substantially conducted into the area 32. The elastic stress in the area 32 is not relieved but is maintained as a result of the force 28. The area 32 extends from the boundary of the zone 30 more deeply into the material 26 defining the box 14. The zone 30 extends preferably beyond the axial length of the location 12 but at least encompasses the area of the surface 24 where the initial two threads 20 will be formed.

Electron beam fusion techniques are best practiced in a vacuum chamber. The end of the drill collar 10 including the box 14 and an adjacent segment is sealed within the vacuum chamber by use of conventional seals (not shown) contacting the outside cylindrical surface of the drill collar, and by use of an internal plug means 38 extended through the conventional drilling fluid passageway 40 of the drill collar 10 to a position adjacent the box 14. The plug 38 includes an inflatable exterior membrane 42. Compressed fluid is delivered through a passageway 44 to expand the membrane 42 against the drilling fluid passageway 40 and thereby seal the drilling fluid passageway 40 at the box end of the drill collar in the vacuum chamber. The electron beam gun 34 is also mounted within the vacuum chamber and is operatively arranged to position the trajectory 36 of electrons in a desired location with respect to the box 14. The gun 34 can be movably mounted for longitudinal movement parallel to the axis of the drill collar 10 or pivotably mounted to move the trajectory 36 through a sector-like arc.

In order to fuse the material in the annular zone 30, the drill collar is rotated about its axis while the electron beam trajectory 36 is moved along the path of the surface 24 parallel to the axis of the drill collar 10. As a result, the zone 30 extends in an annular configuration radially inward from the blank surface 24 in the location 12 where fatigue failures are prone to initiate. Although the zone 30 is described only with respect to location 12, the zone 30 could be extended or located in other areas where beneficial results are desirable.

In addition to the electron beam heating technique, laser beam and plasma heating techniques also offer a high degree of precision and controllability and may be practiced with the present invention. Induction heating and electrical resistance heating can also heat the material in the zone 30, however the depth of penetration of the plastic or liquid state is more difficult to control by present induction and resistance heating techniques.

After the material 26 within the zone 30 has been heated and the stress in the zone 30 thereby relieved, the force 28 is removed, and the elastic tension stress within the area 32 and the other portions of the material 26 outside of the zone 30 is partially released. The elasticity of the material in the area 32 and the force inherently created in attempting to return the material 26 to its nontensily stressed condition induces a compressive stress or force in the zone 30. The amount of compressive stress induced in the zone 30 is counterbalanced by an equal and opposite amount of residual elastic tensile stress remaining in the area 32 after removal of the force 28. The size or volume of the area 32 is selected so that the inherent residual elastic tensile force remaining therein after removal of the force 28 creates a residual compressive force in the zone 30 of sufficient predetermined magnitude to increase the resistance of the box 14 to fatigue failure from tension induced force and the like in the zone 30.

The curve 46 shown in FIG. 3 illustrates the distribution of tension and compression stresses relative to depth in the zone 30 and in the area 32. The portion of graph 46 illustrating compression stress represents the effect in the zone 30 relative to its depth. The portion of graph 46 illustrating tension stress illustrates the effect in the area 32. The point where the graph 46 indicates neither tension stress nor compression stress indicates the maximum depth of penetration of the zone 30.

After the residual compressive force in the zone 30 has been induced as described, threads 48 (including the initial threads 20) are formed or machined in the conventional manner. The threads extend into the material 26 from the blank surface 24 and are integral with the material 26. By forming the threads 48 after inducing the residual favorable stresses in the zone 30, the deteriorating effects of oxidation and warpage during the heating process are avoided because the threads 48 are formed after such deteriorating effects occur, if any. A high degree of dimensional precision and surface finish is thereby attainable on the threads 48.

To further enhance the ability of the box 14 to withstand fatigue failure from tension induced stresses, the roots 50 of the threads 20 and preferably all of the threads 48 are mechanically cold-worked, such as by the use of a peening tool or by the use of a roller 50 as shown in FIG. 5. Thread-rolling cold work is a known technique. A roller 50 is pressed with great force by means of a hydraulic ram (not shown) into the thread root 52 and then moved down the thread spiral. The roller 50 compresses the metal in the thread root and leaves the metal fibers in a layer 52 adjacent the root 52 in a compressed state. Graph 54 shown in FIG. 3 illustrates the stresses in the layer 53 induced by mechanical thread rolling. The graph 54 illustrates that the compression stress extends to a depth only partially as great as the depth of the induced residual compressive force in zone 30, as indicated by the points in FIG. 3 at which the graphs 54 and 46 cross the axis indicating a nonstressed depth.

Although mechanical cold-working and rolling hardening techniques have been applied to the thread roots of conventional drill collars in the past, when combined with the present technique of inducing the considerable deeper zone 30 of residual favorable or compressive stress, a significantly improved threaded connection joint results. Graph 56 shown in FIG. 3 is a composite or summation of both curves 46 and 54 illustrating the result of applying both techniques in combination. Combining both techniques creates a considerably higher residual compressive stress at the roots of the threads to resist the initiation and propagation of cracks.

The amount of residual compressive stress induced as a result of the present invention is generally proportional to the area between the horizontal and vertical axes and bounded by the composite curve 56 of compression stress. Accordingly, it can be seen that the amount of residual compressive stress is substantially greater than that available from mechanical cold working techniques. Applying the method of the present invention to drilling tools and drill collars and threaded coupling and connection joints results in articles of substantially improved resistance to fatigue failure.

Preferred embodiments for practicing the present invention have been shown and described with a degree of particularity. It should be understood, however, that the specificity of the present description is by way of example and that the invention is defined by the scope of the appended claims.

What is claimed is:

1. A method of inducing a residual favorable compressive stress in a zone of stress concentration in at least one of a box or pin of integral metallic material in a drilling tool comprising:

applying a force to tensily stress the integral material of the box or pin in the zone and in an area adjacent the zone within the limit of elasticity of the material, heating the material of the zone into one of a plastic or liquid state while maintaining applied tensile stress in the area adjacent the zone and while confining the plastic or liquid state substantially only to the zone, releasing the applied force after the material of the zone has returned to a nonplastic and nonliquid state, and attaining sufficient residual tensile force from the area adjacent the zone upon release of the applied force to achieve in the zone a counterbalancing residual compressive force at sufficient predetermined magnitude to increase resistance of the box or pin to fatigue failure from service-induced tension forces induced at the zone.

2. A method as recited in claim 1 further comprising: maintaining a predetermined magnitude of tensile stress in the area adjacent the zone while the material of the zone is heated.

3. A method as recited in claim 1 wherein the depth to which the plastic or liquid state extends during heating is greater than the depth to which any known mechanical cold working or rolling hardening technique extends, with reference to an exterior boundary of the zone.

4. A method as recited in claim 3 further comprising controlling the depth of penetration of the plastic or liquid state to a predetermined pattern.

5. A method as recited in claim 4 wherein controlling the predetermined pattern of depth of penetration comprises heating the zone by directing an electron beam into the material of the zone.

6. A method as recited in claim 4 wherein controlling the predetermined pattern of depth of penetration comprises heating the zone by directing a laser beam into the material of the zone.

7. A method as recited in claim 4 wherein controlling the predetermined pattern of depth of penetration comprises heating the zone by plasma heating the material of the zone.

8. A method as recited in claim 1 wherein the zone of stress concentration is at a base location where connection threads of the drilling tool initiate and extend away from the main portion of the drilling tool.

9. A method of manufacturing one of an integral threaded metallic box or an integral threaded metallic pin of a drilling tool with improved resistance to fatigue failure at a zone of service-induced stress concentration encompassing the location of an initial thread of the box or pin, comprising:

forming a blank surface on the drilling tool at which the threads of the box or pin will be formed, applying tensile force to the material of the drilling tool to obtain an applied tensile stress throughout the integral material of the zone and an area of predetermined size adjacent the zone, the zone extending inward from the blank surface into the material to an innermost boundary and the area extending from the innermost boundary of the zone to even greater depths into the material, heating the material of the zone into one of a plstic or liquid state, extending the depth of penetration of the plastic or liquid state from the blank surface to a predetermined depth which is greater than the depth of the threads to be formed at the blank surface, maintaining the magnitude of applied tensile stress throughout the area within the elastic limits of the metallic material of the box or pin while heating the material of the zone, releasing the applied tensile stress in the area after the material of the zone has returned to a nonplastic and nonliquid state, selecting the predetermined size of the area for obtaining sufficient residual tensile force therefrom after releasing the applid tensile force to achieve a counterbalancing residual compressive force of sufficient predetermined magnitude in the zone to increase the resistance of the box or pin to fatigue failure from service-induced tension stresses at the zone, and forming threads into the blank surface after accomplishment of the foregoing steps.

10. A method as recited in claim 9 wherein the zone of stress concentration includes a base location where threads initiate and extend away from the main portion of the drilling tool.

11. A method as recited in claim 9 or 10 further comprising mechanically rolling the material at the roots of the threads after forming the threads.

12. A method as recited in claims 1, 3, 4, 8 or 9 wherein the zone is of annular configuration.

* * * * *